(12) United States Patent
Robb et al.

(10) Patent No.: US 7,196,611 B2
(45) Date of Patent: Mar. 27, 2007

(54) BARRIER MOVEMENT OPERATOR HUMAN INTERFACE METHOD AND APPARATUS

(75) Inventors: Eric J. Robb, Carol Stream, IL (US); Mark Andrew Edgington, Chicago, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 360 days.

(21) Appl. No.: 10/417,596

(22) Filed: Apr. 17, 2003

(65) Prior Publication Data

US 2004/0210327 A1 Oct. 21, 2004

(51) Int. Cl.
| | |
|---|---|
| B60R 25/00 | (2006.01) |
| G05B 19/00 | (2006.01) |
| G06F 7/00 | (2006.01) |
| G08B 29/00 | (2006.01) |
| H04B 1/00 | (2006.01) |
| G05B 13/02 | (2006.01) |
| G05B 19/18 | (2006.01) |

(52) U.S. Cl. ............... 340/5.71; 340/5.7; 340/3.32; 340/480; 340/505; 318/264; 318/265; 318/284; 318/468; 700/47; 700/65; 700/66

(58) Field of Classification Search ............ 700/65–66, 700/47, 56, 59–63, 81–83; 318/264–267, 318/283–286, 484, 466–469, 565, 489, 569; 340/5.61, 5.7, 531, 686.1, 3.32, 5.71, 480, 340/505, 993
See application file for complete search history.

(56) References Cited

U.S. PATENT DOCUMENTS

| | | | |
|---|---|---|---|
| 6,388,412 B1 | 5/2002 | Reed et al. | |
| 6,806,672 B2 * | 10/2004 | Fitzgibbon et al. | 318/468 |
| 2002/0153854 A1 | 10/2002 | Reed et al. | |
| 2003/0178957 A1 * | 9/2003 | Fitzgibbon et al. | 318/280 |
| 2004/0085036 A1 * | 5/2004 | Hom et al. | 318/460 |
| 2004/0239482 A1 * | 12/2004 | Fitzgibbon | 340/5.61 |
| 2004/0243813 A1 * | 12/2004 | Farris et al. | 713/182 |
| 2005/0012631 A1 * | 1/2005 | Gregori et al. | 340/686.1 |
| 2005/0269984 A1 * | 12/2005 | Piechowiak et al. | 318/445 |

FOREIGN PATENT DOCUMENTS

| | | |
|---|---|---|
| CH | 639788 | 11/1983 |
| EP | 0 809163 A3 | 7/1999 |
| WO | WO 03/069352 A2 | 8/2003 |

OTHER PUBLICATIONS

Search Report for British Patent Application GB0408556.9 completed Aug. 27, 2004.

* cited by examiner

*Primary Examiner*—Ramesh Patel
(74) *Attorney, Agent, or Firm*—Fitch, Even, Tabin & Flannery (57) ABSTRACT

Improvements in human interaction with barrier movement operators are disclosed. A controller of the barrier movement operator is capable of a number of learning modes in which the controller cooperates with a user to learn operating parameters. The controller guides and corrects the necessary actions by the user. The barrier movement operator also includes an input/output unit remote from the main controller of the operator. Human interaction with the remote input/output unit enables diagnosis of operator faults remotely.

25 Claims, 6 Drawing Sheets

| ERROR CODE | DESCRIPTION | DISPLAY | CORRECTION |
|---|---|---|---|
| E1 | SWITCH 199 IN INVALID POSITION FOR > 30 SEC. | 1 BLINK | SWITCH 199 MUST BE SET TO A VALID POSITION |
| E2 | STUCK KEY- BUTTON PRESSED FOR > 2 MIN. | 2 BLINKS | STUCK KEY MUST BE UNSTUCK BEFORE IT WILL BE RECOGNIZED AS AN INPUT |
| E3 | OBSTRUCTION SENSED ON CLOSING WITH TTC IN T MODE. WILL EXPLAIN WHY DOOR REMAINS IN THE OPEN POSITION WHEN IT IS EXPECTED TO BE CLOSED | 3 BLINKS | CLEARED BY CLOSE LIMIT |
| E4 | NO RPM INPUT DURING OPENING OR CLOSING | 4 BLINKS | CLEARED WHEN RPM PULSE SEEN |
| E5 | MRT TIMED OUT | 5 BLINKS | CLEARED BY USER COMMAND |
| E6 | SAFETY LIMIT IN WRONG POSITION | 6 BLINKS | CLEARED BY SEEING THE CORRECT LIMIT SEQUENCE |
| E7 | LIMIT ERROR- OPEN & CLOSE LIMITS ACTIVATED AT SAME TIME, OPEN & SAFETY LIMITS AT SAME TIME, WRONG DIRECTION - UNEXPECTED LIMIT- OPEN LIMIT ON CLOSE COMMAND | 7 BLINKS | TBD |

Fig. 6

BARRIER MOVEMENT OPERATOR HUMAN INTERFACE METHOD AND APPARATUS

BACKGROUND

The present invention relates to barrier movement operators and particularly to human interface methods and apparatus for such systems.

Barrier movement operators are known which include a motor for moving a barrier between open and closed positions and a controller for selectively energizing the motor to move the barrier. Gate operators and garage door operators are examples of the wide range of such barrier movement operators. The controller of a barrier operator may be responsive to stimulus signals to perform various barrier movements with safety. For example, the barrier operator may include a control switch which, when pressed, reverses the direction of travel of the barrier or starts the barrier moving toward the open or closed position.

Barrier movement systems have proven to be safe and efficient in their operation and as the technology evolves more and more safety and convenience features have been added. Such new features are a benefit in the operation of barrier movement operator however, they have tended to make the installation and maintenance of the operators more complicated. A need exists for improved human interaction with barrier movement operators to simplify their installation and maintenance.

DESCRIPTION

Figure 1:
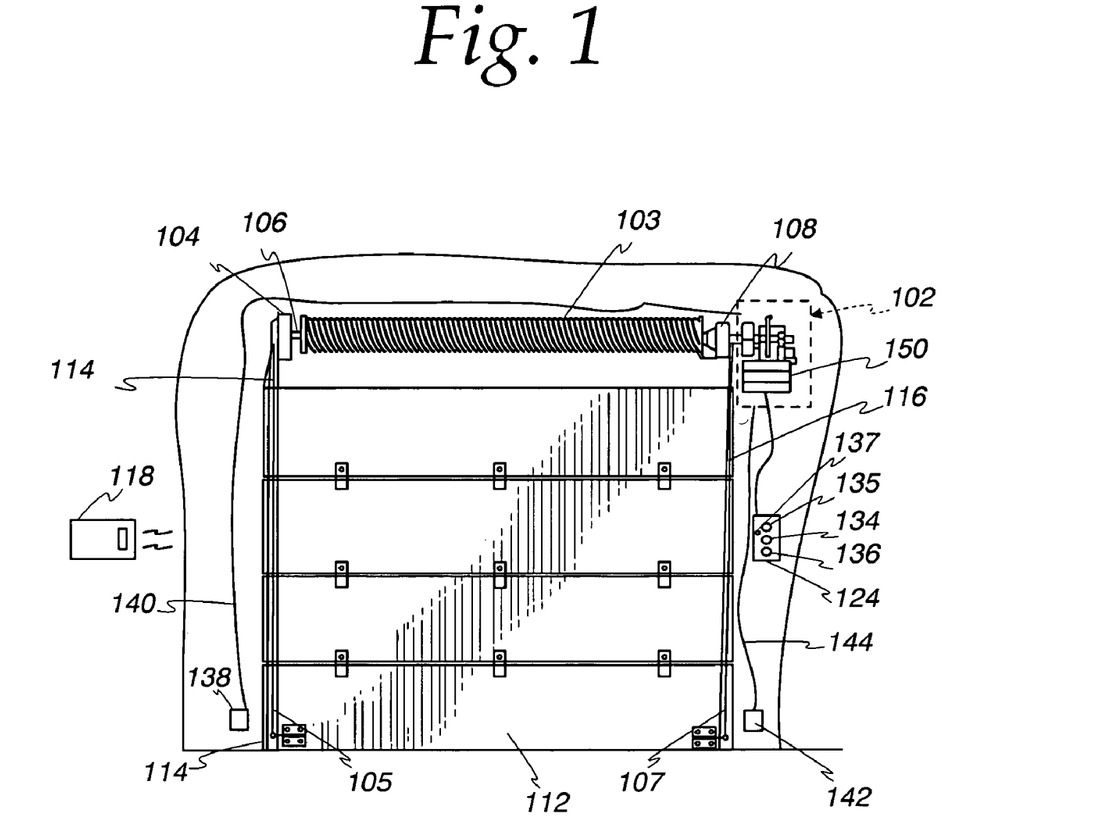
FIG. 1 is a view of a barrier movement operator.

FIG. 1 is a view of an embodiment of a barrier movement operator. FIG. 1 shows a jack shaft balanced, powered jack shaft moved residential garage door movement operator. It will be understood from the following that the improvements described and claimed herein apply to other types of barrier movement systems such as commercial door operators, rolling gate operators, swinging gate operators, other types of balancing such as tension spring, and other types of movement such as high lift and powered rail and trolley.

Figure 2:
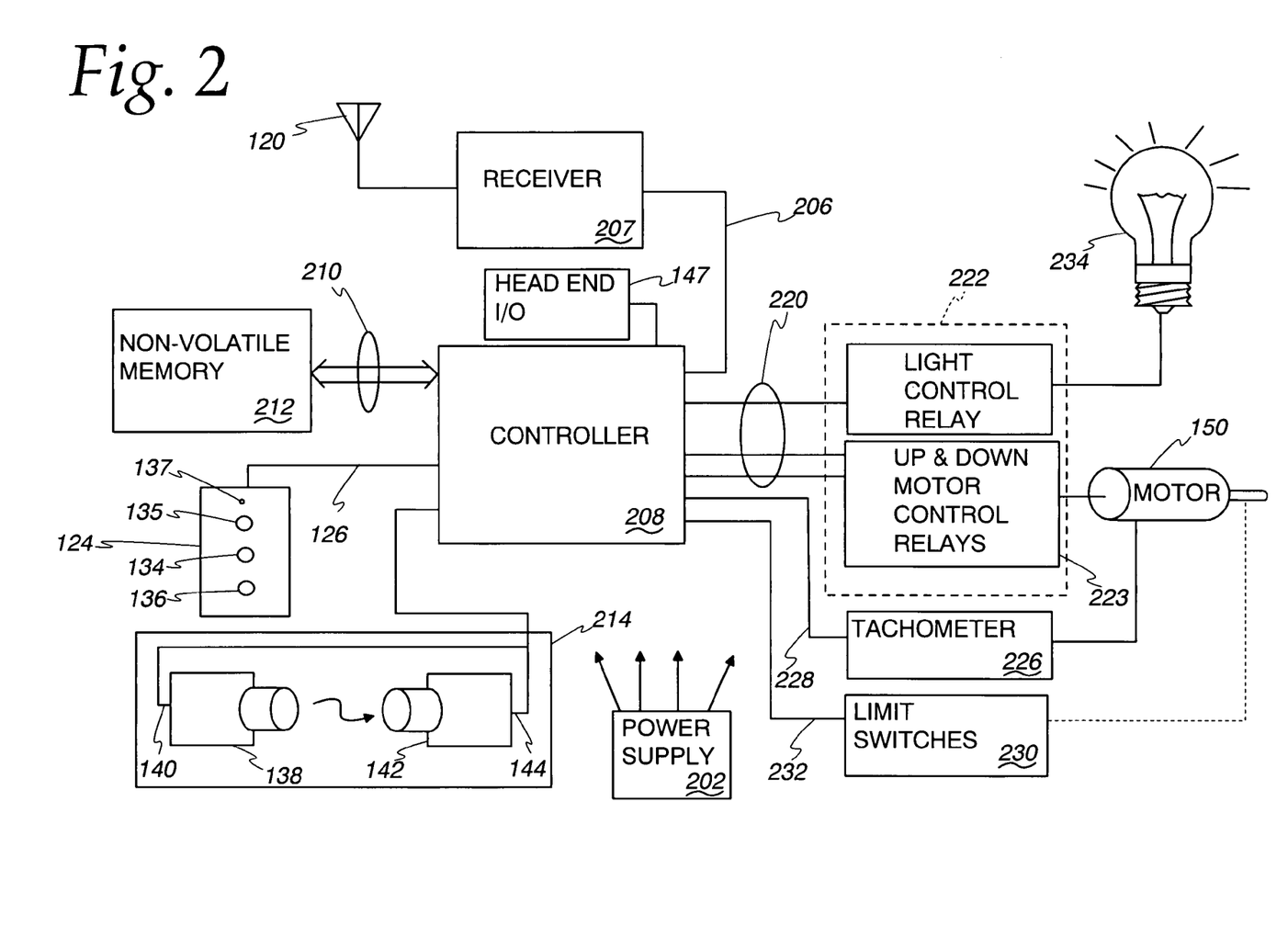
FIG. 2 is a block diagram of a controller of the barrier movement operator and apparatus which interacts with the controller.

In the embodiment of FIG. 1, a panel door 112 is raised and lowered in a pair of side tracks 114 and 116. Door 112 is connected by cables 105 and 107 to a pair of drums 104 and 108 disposed on a jack shaft 106 and rotated under the power of a motor 150 contained by a head end 102. The motor is selectively energized by a controller 208 and associated apparatus (FIG. 2) to move the door 112 between a closed position, as shown in FIG. 1, and an open position. The controller 208, which includes a programmed microprocessor, responds to user input signals from a wall control 124 and an rf transmitter 118 to initiate door movement. Obstructions to door movement may be detected by an optical transmitter 138 and receiver 142 which "watch" the door opening to detect when an obstruction is beneath the door. Similarly, an optional door edge sensor (not shown) may be attached to the bottom of the door to detect physical contact with an obstruction.

When the barrier movement operator is installed, the controller 208 is taught the open and closed positions of the door so that the motor 150 is energized only long enough to move the door between those limit positions. The described embodiment automatically learns the open and closed limits of door travel, with installer assistance and stores representations of the learned limits in a memory of controller 208. The position of the barrier as it is moved is tracked by counting RPM signals representing the rotation of motor 150 and stored in the controller memory. Periodically the stored position tracking information is compared to a known position and the stored position is updated as needed.

The wall control 124 includes an open push button 135, a close push button 134 and a stop push button 136. After the barrier operator is installed, a user may press the open or close buttons 135 and 134 of wall control 124 which signals controller 208 via a path 126. Controller assesses the present state of the barrier based on various inputs discussed and sends a signal on a communication path 220 to control relays 222 which apply power to motor 150 and to an optional light 234. For example, when the barrier 112 is at the open limit and push button 134 is pressed, controller 208 energizes relays 222 to energize motor 150 to move the barrier toward the closed limit. During such movement the optical sensors 138 and 142, and other safety equipment, are surveyed to assure safe movement of the door. A user can also initiate barrier movement by rf transmitting an appropriate security code from a transmitter 118 in a manner well known in the art. Such an rf transmission is received by a receiver 207 via an antenna 120 and the resultant received signal is sent on to controller 208. A non-volatile memory 212 stores previously learned security codes and when a match exists between a previously learned code and a received code, the controller operates the door in the same manner as if a button of wall control 124 had been pressed.

Figure 3:
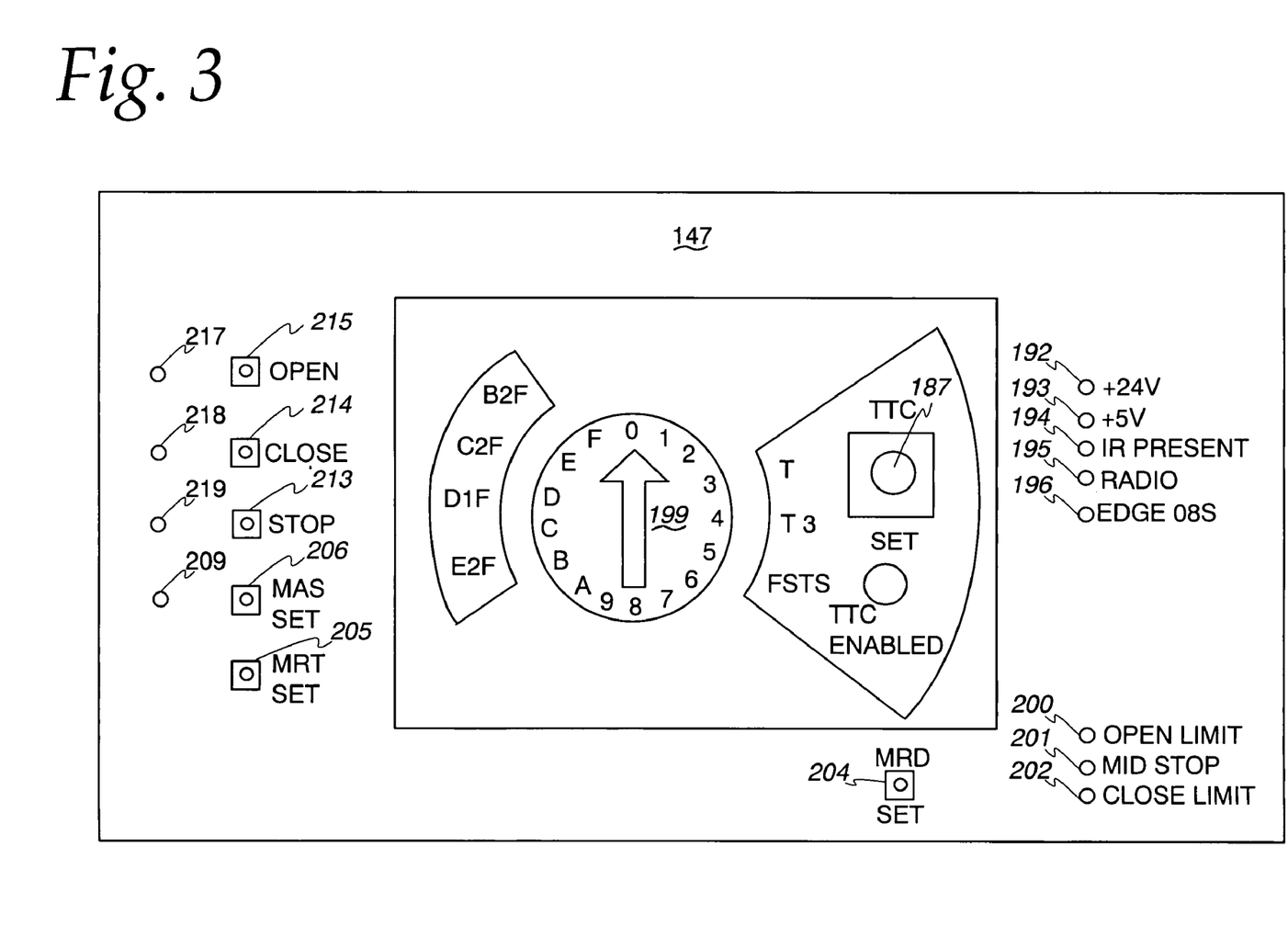
FIG. 3 represents an interface with the controller of a barrier movement operator.

The controller is also connected to a plurality of input/output devices 147 which are represented in greater detail in FIG. 3. The input/output devices are normally contained within head end 102 and are useful to installers and maintainers of the barrier movement operator. Input/output devices 147 includes a rotary switch 199 which a user rotates to set a particular wiring type for the operator (positions B, C, D, E, F, 1, 2, 3, 4 or 5) or request a special operation such as diagnosis (position 9) or programming (position 8). The various wiring types are known in the art and are not discussed in detail herein. A plurality of indicator LEDs are also included to advise a user of the status of particular controller functions. Such LEDs include 24V status 192, 5V status 193, IR present 194, radio present 195 and edge obstruction 196. As the controller 208 surveys the items represented by the LEDs 192–196 it lights them to show actual status. The status of the barrier is also displayed by a plurality of LEDs 197, 198 and 199 which are individually lighted when the barrier is at the open limit, a mid-travel limit and the closed limit, respectively. A plurality of learn enable switches 187, 204, 205 and 206 are also provided. The controller responds to a press of timer-to-close set switch 187 by entering a learn mode to learn a time value for the timer-to-close routine. Controller responds to a press of mid-learn switch 204 by entering a learn mode to learn an optional mid-travel position. Similarly, a switch 205, when pressed, causes the controller 208 to enter a maximum run time learn mode in which the time of travel between the open and closed position is learned. Finally, a maintenance alert switch 206 when pressed causes controller 208 to enter a mode in which predetermined maintenance parameters are learned which are used later to notify users, via a MAS LED 209 that maintenance is to be performed.

An open switch 215, a close switch 214 and a stop switch 213 are also provided to allow maintenance personnel to control the barrier from the head end 102. In addition, an open LED 217 is associated with the open switch 215, a close LED 218 is associated with the close switch 214 and a stop LED 219 is associated with the stop switch 213.

The present embodiment includes a timer-to-close feature which is in part implemented with routines to be performed by controller 208. The timer-to-close feature automatically moves the barrier toward the closed position when the barrier has been in the open position for a predetermined period of time. The predetermined period of time may be preset and stored in controller 208 at the time of manufacture or optionally it may be established by user controlled methods during installation.

Controller 208 continues to survey the operating characteristics of the barrier movement operator as it functions. During the continuing surveys some errors may be detected and representations of the errors are stored in memory of the controller 208. Occasionally the errors become serious enough that the controller 208 stops moving the barrier and awaits servicing by maintenance personnel. Maintenance personnel can grasp the efficacy of the barrier movement operator by assessing the error codes and correcting whatever faults and errors might be represented by the error codes. The present embodiment provides methods and apparatus for maintenance personnel or other user to read the error codes remotely from the head end 102.

Figure 4:
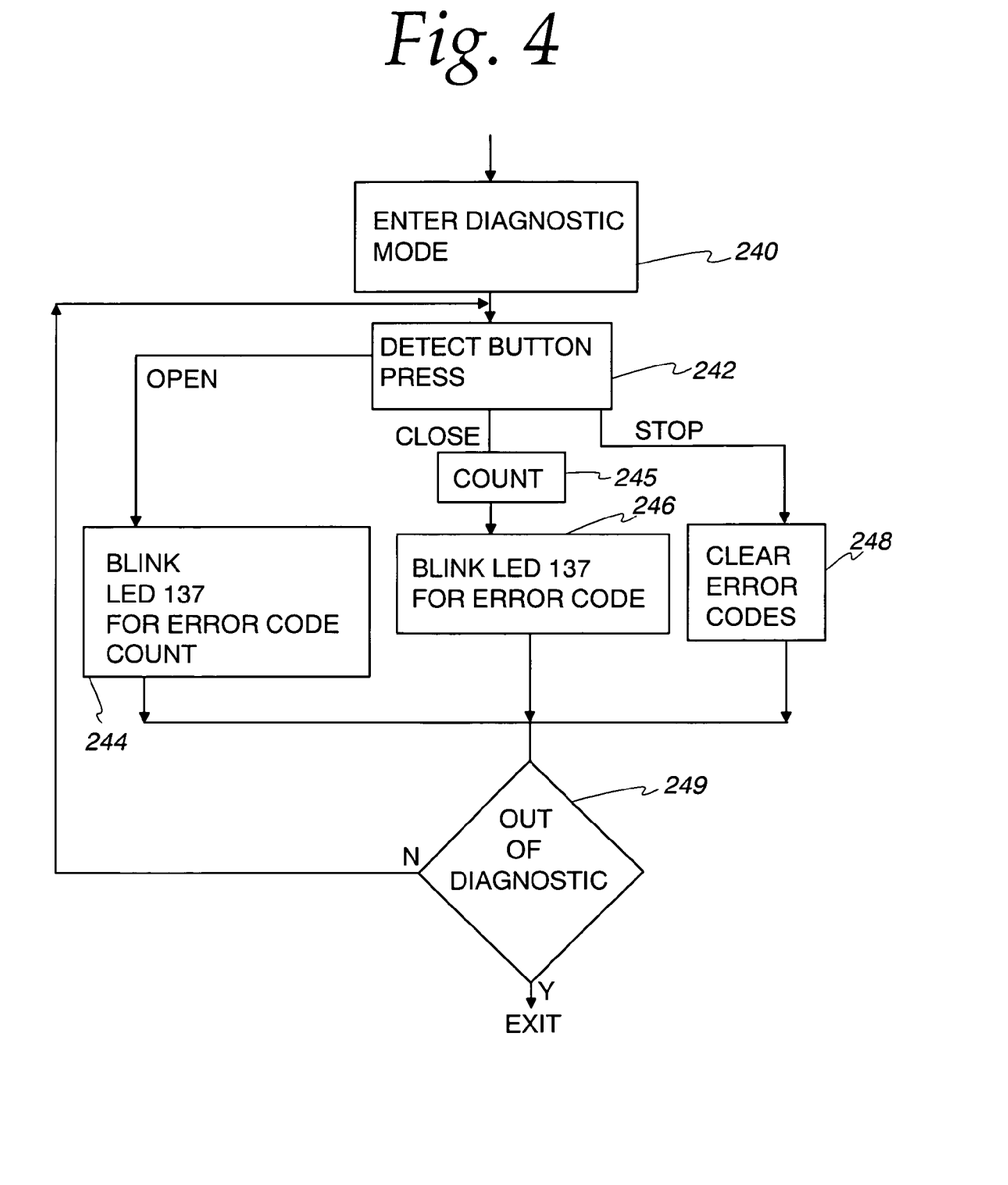
FIG. 4 is a flow diagram of an interactive diagnostic function.

The diagnostic mode of operation is entered by controller 208 in response to the user setting switch 199 to the diagnostic position 9. In the diagnostic mode the user can access error codes from controller 208 by input signals from wall control 124 which is mounted remotely from head end 102. The error codes are displayed at wall control 124 by blinking an LED 137 thereof. FIG. 4 represents the responses of controller 208 to user interaction with wall control 124. The flow diagram of FIG. 4 begins with block 240 in which controller 208 enters diagnostic mode in response to user control of switch 199. When a user presses one of the push buttons 134, 135 and 136 while controller 208 is in the diagnostic mode, a block 242 is performed to determine which switch was pressed. When block 242 determines that the open switch 135 was pressed a block 244 is entered in which pulses are sent to LED137 causing it to pulse once for each stored error code. This action provides the user with the number of error codes stored by controller 208. After block 244 flow proceeds to block 249 where a determination is made whether the diagnostic mode is to be continued or whether the user has changed the position of switch 199 to a position indicating some other function. When switch 199 remains in the diagnostic position, flow proceeds back to block 242 to await another button press.

Figure 5:
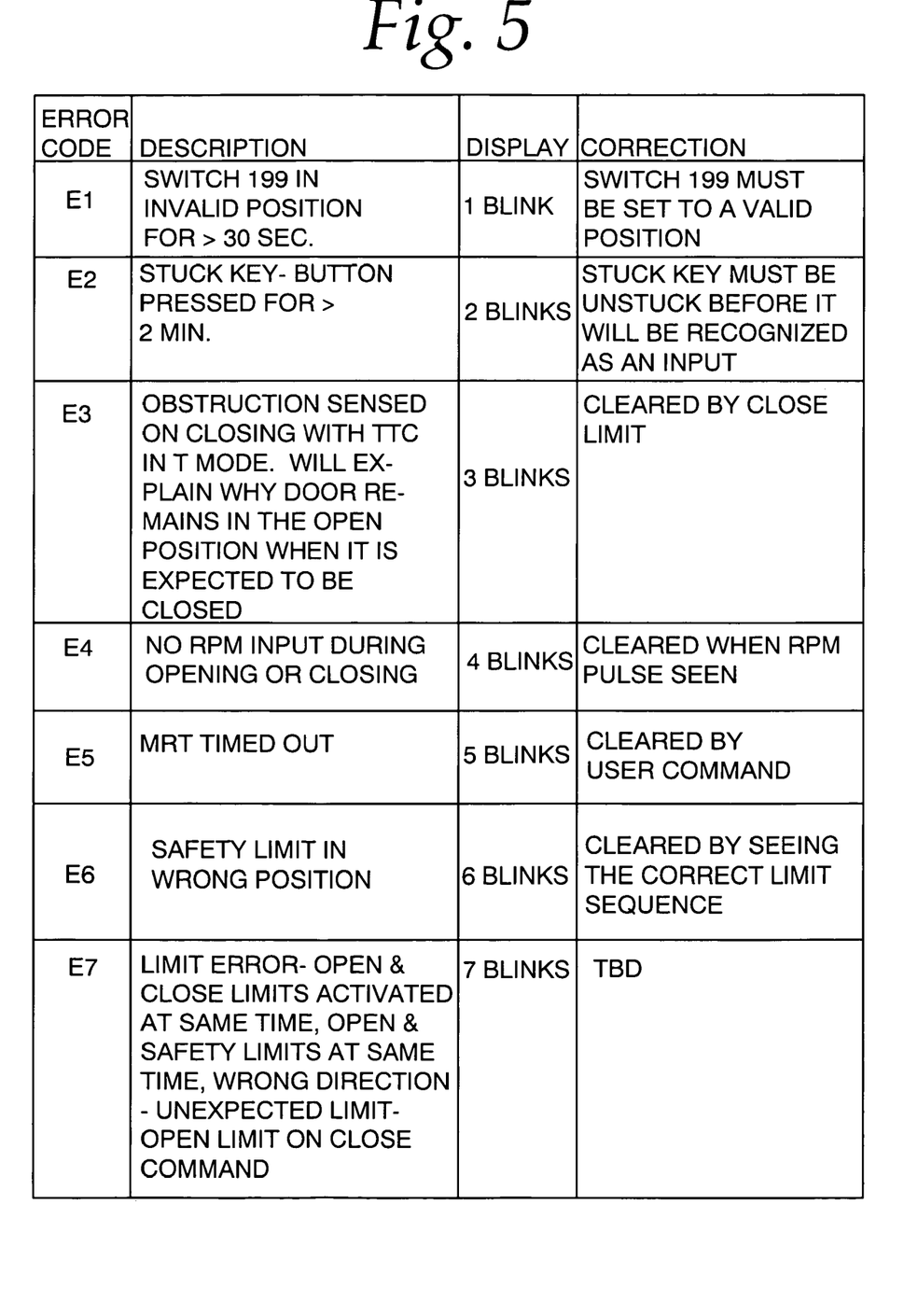
FIG. 5 is a table showing signaling for various error codes.

When block 242 detects a press of the close button 134, flow proceeds to block 245 where the number of close button presses since entering the diagnostic mode is counted. From block 245 flow proceeds to block 246 in which controller 208 sends a number of pulses to wall control 124 to pulse LED137 a number of times corresponding to the next error code. FIG. 5 shows seven error codes and the number of blinks which corresponds to each.

When controller 208 has stored more than one error code, the next error code is displayed for each transit through block 246. That is, the first error code will be displayed the first time block 246 is performed during a diagnostic mode and the second through the $n^{th}$ stored error codes are displayed on the second through the $n^{th}$ transition through block 246.

When block 242 detects that the stop button 136 has been pressed; controller 208 clears all stored error codes in a block 248 and proceeds to block 249. Eventually a user will switch controller 208 from the diagnostic mode causing an exit of the flow diagram of FIG. 4.

Figure 6:
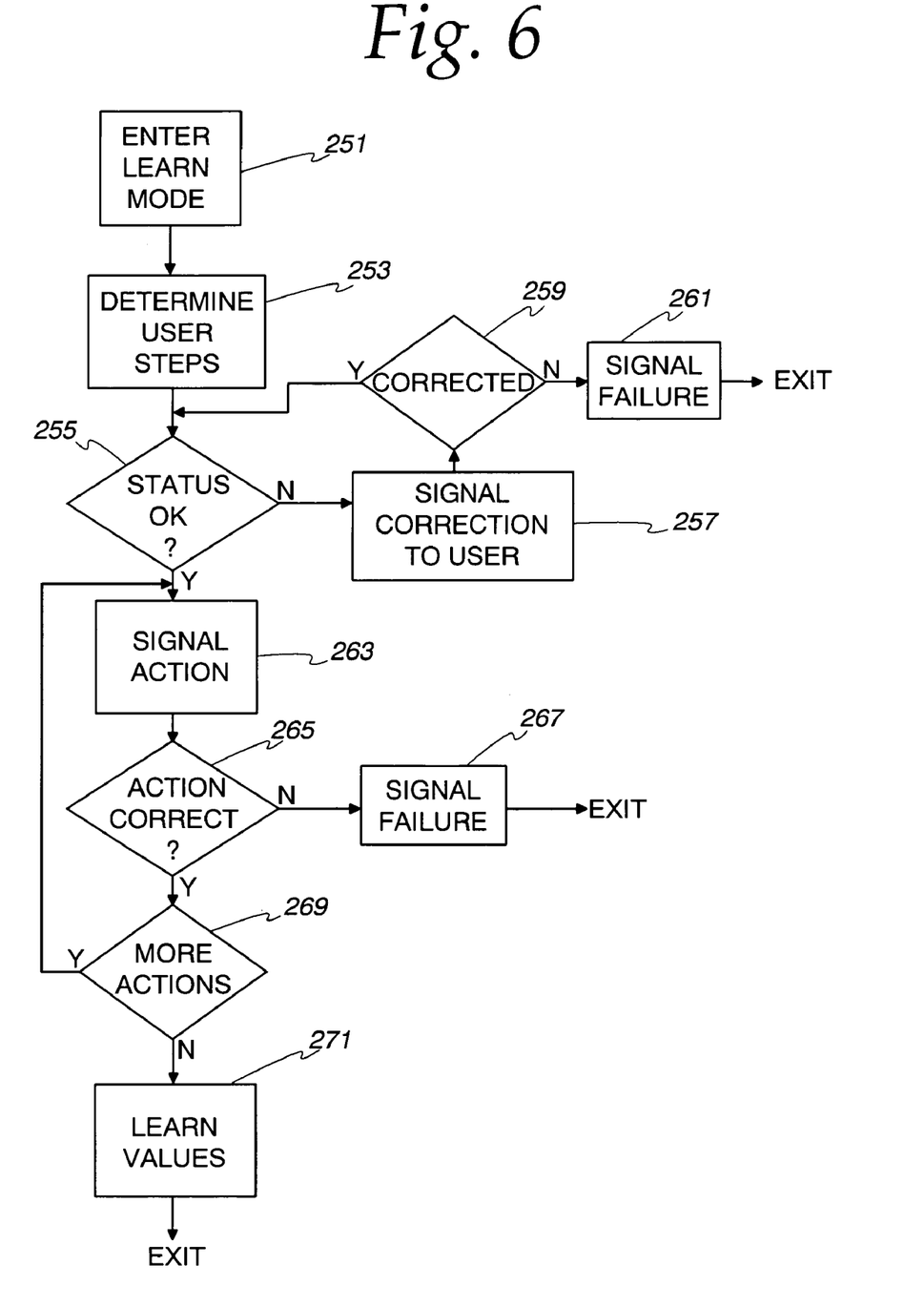
FIG. 6 is a flow diagram of an interactive learn mode function.

The present embodiment also includes the ability to guide a user through installation and learn mode actions. FIG. 6 is a flow diagram of such guidance by controller 208. FIG. 6 begins at block 251 in which a learn mode operation begins and proceeds to block 253 in which controller 208 determines the user activities or steps needed during the learn process. From the performance of block 253 controller identifies the proper beginning status (such as barrier position) of the barrier movement operator. Block 255 checks actual status to determine whether or not the operator is in the proper beginning status. If not, an indication of the correct status is displayed to the user in a block 257 and a check is performed in block 259 to determine if the correction to the proper status has been performed by the user. If the correction action is not taken within a predetermined period of time flow proceeds to block 261 where failure is displayed to the user and the learn mode is exited.

When block 259 determines that the proper correction has been made flow proceeds to block 263 via block 255. In block 263 the first user action is identified to the user. A check is then performed in block 265 to determine whether the correct action has been taken within a predetermined period of time. If not, failure is signaled to the user in block 267 and the learn mode is exited. When block 265 determines that the correct action has been taken a block 269 is performed to identify if more actions are needed. Flow returns to block 263 and a loop continues until block 269 determines that no further steps are needed in which case the parameters are learned (stored) in block 271 and the learn mode is exited.

The following is an example of the interactive learn mode in accordance with FIG. 6 as performed to learn a time value for the max run timer. This timer is used by controller 208 to determine whether the movement of the barrier has been going on for too long without reaching the destination limit. The value for the max run timer is generally a measured time between open and closed limits plus five to 10 seconds. Initially the user presses the MRT set button 205 (FIG. 3) to begin the learn mode. Controller responds by identifying the proper beginning status and steps for the user to perform. For this learn mode the barrier is to start from the closed limit. If the door is not at the closed limit, the close limit LED 202 is flashed to advise the user who should then move the door to the closed limit. If the user does not move the barrier to the closed limit all of the limit LEDs 200, 201 and 202 are flashed to advise of the failure and the learn mode is exited. If the barrier is moved to the closed limit when directed (or was in the closed limit position when the learn mode began) controller 208 flashes the open LED 217 to direct the user to move the barrier to the open position by pressing the open button 215. Should the open button not be pressed or should the barrier for other reasons not be moved to the open limit, failure is signaled and the learn mode is exited. However, if the open button is pressed by the user and the barrier proceeds to the open limit the controller 208 counts the time of travel and adds five seconds to the counted value and stores the result for use in controlling the barrier movement operator.

What is claimed is:

1. A barrier movement operator comprising:
   a controller, responsive to user input signals and operational signals for selectively energizing a motor to open and close a barrier;
   a remote input/output unit connected to the controller and remote therefrom for receiving user inputs and for displaying status of portions of the barrier movement operator;
   the controller for identifying faults in the operation of the barrier movement operator; and
   apparatus for communicating the identities of faults in the operation of the barrier movement operator to the remote input/output unit and for displaying the identified faults at the remote input/output unit.

2. A barrier movement operator in accordance with claim 1 wherein the controller comprises apparatus for selecting one of an operating mode or a diagnostic mode.

3. A barrier movement operator according to claim 2 wherein the remote input/output unit comprises a first input device responsive to user interaction while in the operating mode for transmitting signals to the controller representing barrier movement requests.

4. A barrier movement operator according to claim 3 wherein the remote input/output unit is responsive to user interaction while in the diagnostic mode for transmitting signals to the controller representing diagnostic inquiries.

5. A barrier movement operator according to claim 2 wherein the remote input/output unit comprises a first display device operative while in the operating mode for displaying operating parameters and operative in the diagnostic mode for displaying diagnostic parameters.

6. A barrier movement operator in accordance with claim 1 wherein the remote input/output unit comprises a user actuatable error code query input device.

7. A barrier movement operator in accordance with claim 6 wherein the controller responds to an error code query input from the remote input/output unit by sending to the remote input/output unit, error codes identifying faults detected in the operation of the barrier movement operator.

8. A barrier movement operator in accordance with claim 7 comprising display apparatus at the remote input/output unit on which the error codes from the controller can be displayed.

9. A barrier movement operator in accordance with claim 8 comprising apparatus at the remote input/output unit for requesting a plurality of error codes in sequence from the controller.

10. A barrier movement operator in accordance with claim 1 wherein the apparatus for communicating communicates error codes representing the fault identities to the remote input/output unit and the remote input/output unit comprises display apparatus for displaying the error codes.

11. A barrier movement operator according to claim 1 wherein the controller comprises apparatus for storing error messages generated during the operation of the barrier movement operator.

12. A barrier movement operator according to claim 11 wherein the remote input/output device comprises apparatus for requesting stored error messages from the controller.

13. A barrier movement operator according to claim 12 wherein the remote input/output device comprises a user actuatable push button for requesting stored error messages from the controller.

14. A barrier movement operator according to claim 11 wherein the error messages are displayed as predetermined number of flashes on an LED of the remote input/output device.

15. A barrier movement operator according to claim 14 wherein the remote input/output device comprises a user actuatable push button for clearing the error messages stored by the controller.

16. A barrier movement operator according to claim 14 wherein the remote input/output device comprises a user actuatable push button for requesting the number of error messages stored by the controller.

17. A barrier movement operator comprising:
    a motor for moving a barrier between an open and closed position;
    a controller for selectively energizing the motor in response to door control input signals;
    a command unit, remote from the controller, comprising at least one user controllable device for sending door control input signals to the controller and comprising an indicator light; and
    the controller, comprises a routine for communicating error messages to a user by controllidly turning the indicator light on and off.

18. A method of assisting in the installation and maintenance of a barrier movement operator including a controller, comprising:
    activating a learn mode activity of the controller of the barrier movement operator which learning mode requires pre-determined activities by a user;
    first identifying by the controller the present status of the barrier movement operator;
    second identifying by the controller, the activities to be completed by a user of the barrier movement operator; and
    responsive to the first and second identifying steps transmitting guidance signals to an annunciating unit for guidance of the user.

19. A barrier movement operator according to claim 18 comprising receiving indications of activities performed by a user during the learn mode; and
    annunciating the next activity to the user after the performance of a prior activity by the user, when the prior activity meets pre-determined parameters.

20. A barrier movement operator according to claim 19 annunciating incorrect performance to a user when the prior activity does not meet pre-determined parameters.

21. A method of controlling a barrier movement operator comprising:
    identifying a user interactive mode of operation;
    determining the operator statuses and the user actions to complete the interactive mode;
    signaling the user to perform a first action in furtherance of the interactive mode operation;
    determining that the first action has been correctly performed and signaling the user of a next action in the interactive mode operation.

22. A method of controlling a barrier movement operator according to claim 21 comprising
    determining that the first action was not correctly performed and signaling an alert to the user.

23. A method of controlling a barrier movement operator according to claim 21 comprising
    determining that the status of the barrier movement operator is correct before signaling that a first action is to be performed by the user.

24. A method of controlling a barrier movement operator according to claim 21 comprising
   determining that the status of the barrier movement apparatus is not correct for the performance of the first action; and
   signaling the user to correct the status of the barrier movement operator.

25. A method of controlling a barrier movement operator according to claim 21 wherein the user interacts with the barrier movement operator to initiate the interactive mode.

* * * * *

UNITED STATES PATENT AND TRADEMARK OFFICE
CERTIFICATE OF CORRECTION

| | | |
|---|---|---|
| PATENT NO. | : 7,196,611 B2 | Page 1 of 1 |
| APPLICATION NO. | : 10/417596 | |
| DATED | : March 27, 2007 | |
| INVENTOR(S) | : Eric J. Robb and Mark Andrew Edgington | |

It is certified that error appears in the above-identified patent and that said Letters Patent is hereby corrected as shown below:

IN THE CLAIMS:
Claim 13, Column 5, Line 64: Change "claim 12" to -- Claim 11 --;

Claim 14, Column 6, Line 1: Change "claim 11" to -- Claim 12 --;

Claim 15, Column 6, Line 5: Change "claim 14" to -- Claim 13 --;

Claim 16, Column 6, Line 9: Change "claim 14" to -- Claim 13 --.

Signed and Sealed this

Twenty-sixth Day of June, 2007

JON W. DUDAS
*Director of the United States Patent and Trademark Office*